IRVING W. HAMMER
INVENTOR.

BY William G. O'Neil
AGENT

IRVING W. HAMMER
INVENTOR.

BY William T. O'Neil
AGENT

United States Patent Office 3,444,555
Patented May 13, 1969

3,444,555
FREQUENCY SCANNING RADAR SYSTEM WITH IMPROVED ANGULAR TARGET DETECTION
Irving W. Hammer, Los Angeles, Calif., assignor to International Telephone and Telegraph Corporation, New York, N.Y., a corporation of Delaware
Filed June 6, 1967, Ser. No. 643,981
Int. Cl. G01s 7/28, 9/02
U.S. Cl. 343—16          10 Claims

ABSTRACT OF THE DISCLOSURE

A radar system is described which uses an antenna which is frequency sensitive in at least one plane. A transmitter system provides pulses of excitation which is varied in frequency, substantially uniformly with time, over the duration of each pulse. Pulse compression is also preferably included, so that relatively long pulses may be employed to raise the average energy of illumination without deteriorating range or angular resolution. An additional subsystem analyzes the frequencies reflected by a given target, through comparison with a programmed mid-pulse nominal frequency, and when using an indicator for data display, modifies the indicator angular sweep control signal as a refinement over the primary angular control provided by the transmitted frequency control means.

BACKGROUND OF THE INVENTION

Field of the invention

This invention relates to radar systems, and more particularly, to pulsed radar systems with variable transmitted frequency within each pulse.

Description of the prior art

In a typical modern three-dimensional radar system, a pencil beam (i.e., a beam which is relatively narrow in both azimuth and elevation planes) is rapidly scanned in elevation and scanned contemporaneously in azimuth at a relatively slow rate. The video data thus produced may be presented on a range-height indicator and also on a PPI. The scan in a typical system is afforded by making the antenna frequency sensitive in the elevation plane and by appropriately varying the frequency of excitation. Such a scan is inertialess and may therefore, be effected at a rapid rate. Azimuth scan is accomplished independently, as by mechanical rotation of the antenna assembly, for example. One type of frequency scanned radar system of the foregoing general type is described in U.S. patent application Ser. No. 570,991 filed Aug. 8, 1966, entitled: Pencil Beam Frequency/Phase Scanning System, assigned to the same assignee as the present invention.

A prime problem with pulsed single beam radars (a generic group into which the pencil beam frequency-scanned system falls) has been the inability to fully utilize the average power capability of available transmitting tubes to thereby achieve maximum range performance. The obvious expedient of increasing pulse width to increase the average illumination power at any given scan angle has the effect of deteriorating the range resolution, frequently intolerably.

A known solution to the pulse width/average illumination power/range resolution dilemma lies in the use of "chirp" or frequency modulation within the transmitted pulse followed by pulse compression applied to received signals. In this way the larger signal energy in a long signal pulse may be concentrated into a shorter time, giving the target resolution available with a shorter transmitted (and received) pulse along with substantial signal-to-noise improvement for the same peak transmitted power.

A reference which describes the type of pulse compression useful in the combination of the present invention is contained in a series of articles entitled "Matched Filtering, Pulse Compression and Waveform Design" by M. Bernfeld, C. E. Cook, J. Paolillo and C. A. Palmieri, published in a four part series beginning in the October 1964 issue of "The Microwave Journal" and continuing monthly in that publication through January 1965. In particular, the type of pulse compression illustrated at FIGURE 2 (page 58 of the October 1964 issue) is the type contemplated for inclusion in the system of the present invention. The use of a linear delay receiver responding to the echo signals resulting from the linearly frequency modulated transmitted pulses is explained in that reference, and will be again referred to in the description of the preferred embodiment.

Summary of the invention

The present invention concerns a novel system for improving the angular accuracy of a frequency-scanning pulsed radar. Preferably, pulse compression is included as part of the combination, however, for practice of the angular accuracy improvement aspect of the invention, pulse compression, although desirable, is not a necessity.

Although not limited to frequency scanning in the elevation plane, the instrumentation of the present invention would normally be effective along a single axis. Scan in the other axis, if required, would be accomplished by some other means, such as mechanical rotation of the antenna.

Each individual, relatively long RF pulse is frequency modulated and because of the frequency sensitivity of the antenna, is radiated at diffrent angles during the transmission of the (ranging) pulse. Successive pulses are programmed to scan different small fractions of the said total elevation angle of interest, and the controlling program provides (on the basis of its own predetermined programming) a sweep angle controlling signal for the indicator display. Due to temperature and other effects on the angle-versus-frequency relationship within the antenna and to various delays and second order effects, the accuracy of this sweep control is inherently limited.

In the present invention, pulse compression (applied preferably at IF) eliminates the disadvantageous effect of long pulses on target resolution. Particularly unique means are included in the form of a discriminator which compares the frequency of the target echo with the programmed pulse center frequency (both frequencies referred to IF) and develops a correction or vernier signal which modifies the aforementioned sweep angle controlling signal. In this way, a "closed-loop" correction is effected which enhances the angular accuracy of the cathode ray display, which, in the illustrated embodiment is a range-height indicator.

Brief description of the drawings

For the purpose of illustrating the concepts of the present invention, drawings are provided as follows:

FIGURE 3b is a waveform diagram of frequency versus time illustrating the variation of transmitted frequency within each pulse illustrated in the foregoing FIGURE 3a.

Description of the preferred embodiment

Figure 1:
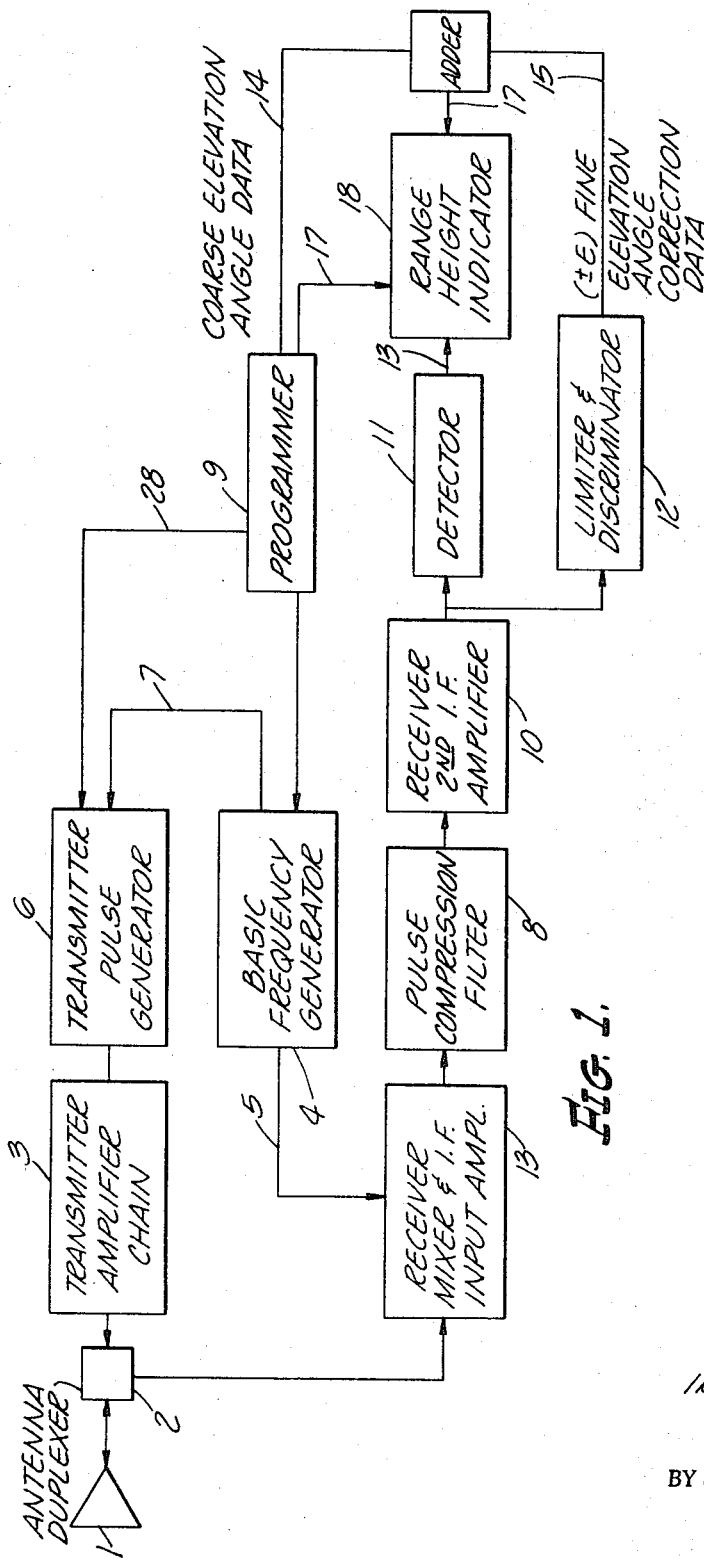
FIGURE 1 is a functional block diagram of a system in accordance with the present invention.

Referring now to FIGURE 1, the elements of the basic system will be described and their function in the combination set forth.

Antenna 1, while not limited to any particular configuration, is defined as being frequency sensitive at least in a single plane of interest. For purposes of this description, it will be assumed that the plane of interest is the elevation plane insofar as the frequency setnsitivity of the antenna 1 is concerned. Azimuth scan will be presumed to be obtainable by means of mechanical rotation in azimuth according to well known principles.

Of the various antenna configurations which are capable of supplying the frequency sensitivity, a typical one is described in U.S. Patent 3,039,097.

Various systems are also extant for energizing an antenna such as the foregoing with variable frequency transmitter energy in order to effect a pre-determined frequency-controlled scan.

Figure 3A:
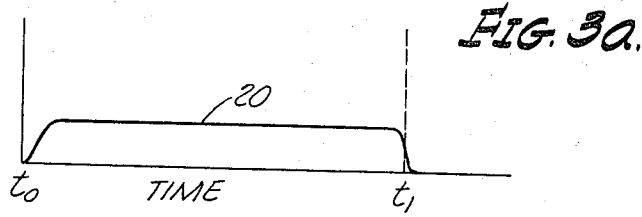
FIGURE 3a is a waveform diagram illustrating the transmitted pulse shape (i.e., an amplitude versus time function).

The aforementioned U.S. patent application Ser. No. 570,991 describes one type of frequency scan in a plane. Other types in which the pulses of energy are at discrete frequencies in close spaced groups have also been instrumented in the prior art. The system of the present invention relies on relatively long transmitted pulses within which the frequency of transmitted energy is continuously varied (i.e., frequency modulated). Looking forward momentarily to FIGURES 3a and 3b, this fundamental characteristic of the present system is illustrated. In FIGURE 3a the amplitude versus time envelope of the transmitted pulse 20 is shown extending from $t_0$ to $t_1$.

Figure 3B:
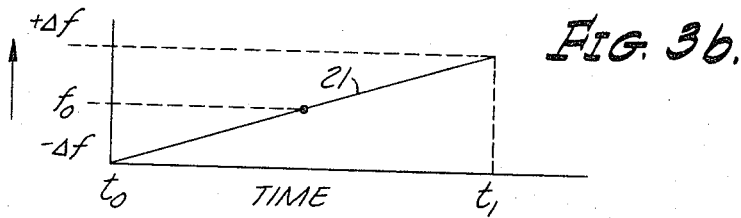

In FIGURE 3b it will be noted that the frequency function 21 begins with $(f_0 - \Delta f)$ at time $t_0$ and progresses through $f_0$ substantially in linear progression to the frequency of $(f_0 + \Delta f)$ at time $t_1$.

It should be mentioned at this point that $f_0$ is a discrete center frequency for each transmitted pulse, and therefore is a different frequency for each successive transmitted pulse.

Coverage of the entire elevation angle of interest may be effected in the present system by fitting together, with or without overlap, a series of limited continuous frequency scan increments.

A duplexer 2 performs the well known transmit-receive function common to most pulsed radar systems.

Figure 2:
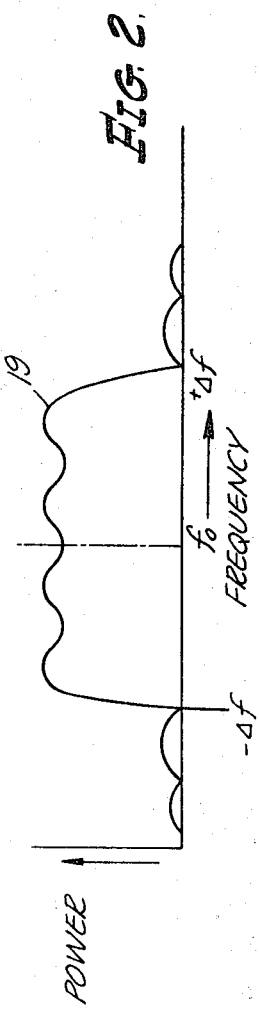
FIGURE 2 is a waveform diagram illustrating the transmitted pulse power spectrum.

The transmitter amplifier chain 3 comprises at least one amplitron, travelling wave-tube, or other suitable broadband power amplifier stage, capable of accepting and power amplifying the full range of frequencies corresponding to the entire scan angle of interest. The power spectrum is relatively flat over that range of frequencies and is typically illustrated at 19 in FIGURE 2. The transmitter pulse generator 6 provides the transmitter amplifier chain 3 with the individual relatively long transmitted pulses which are frequency modulated over their durations. This transmitted pulse generator 6 is, in turn, supplied by a continuous accurately programmed frequency schedule on lead 7 and suitable pulse generating control triggers or gates on lead 28. Thus, the transmitter pulse generator 6 will form pulses in accordance with the frequency provided by 4 at the particular time of pulse formation. A continuous local oscillator signal is also provided by the basic frequency generator 4 on the lead 5. This local oscillator signal is, at all times, separated in frequency from the center transmitter programmed frequency ($f_0$) for each transmitted pulse by a fixed amount equal to the intermediate frequency of the receiver 13, in accordance with standard superheterodyne receiver theory.

The programmer 9, in addition to providing the aforementioned triggering and timing pulses for the control of the basic frequency generator 4 and the transmitter pulse generator 6, also provides indicator synchronizing trigger pulses on line 17 and coarse elevation angle data on lead 14, which will be discussed in detail at a later point in this description.

It may be said that the programmer 9 provides the "clock" or master control pulses and gates to initiate radar transmission, generates the control signals to determine the transmitted beam position by controlling the generation of sequential frequency signals, and provides indicator synchronization and sweep angle control. The sequential timing and control signals are appropriate to the desired radar range and granularity of elevation hits for each complete elevation cycle. It would be expected that a number of pulses, each with a different $f_0$ would be required to cover the entire elevation angle of interest, and accordingly, a large number of these elevation scans would occur during each complete revolution of the antenna in azimuth. The receiver 13 must have an appropriate overall bandwidth to accept the full range of frequency variations possible from target echo signals as a result of any one transmitted pulse, but otherwise operates in a conventional manner.

Figure 4A:
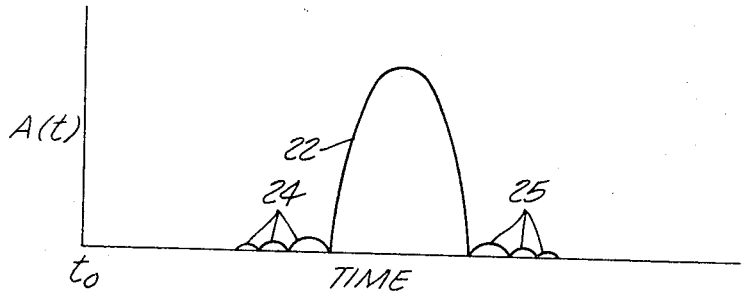
FIGURE 4a is a waveform diagram illustrating a typical received pulse shape before compression.
Figure 4B:
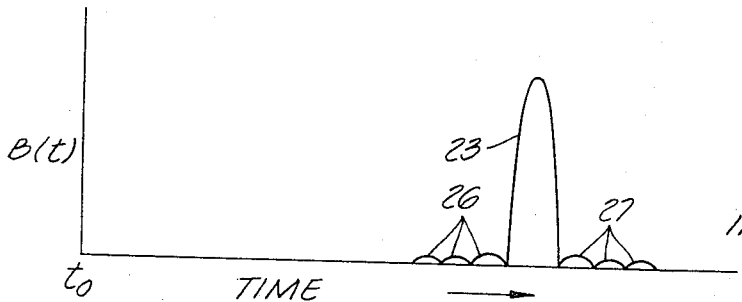
FIGURE 4b is a waveform diagram illustrating the received pulse shape after compression.

In considering the pulse compression filter 8, I digress momentarily to FIGURES 4a and 4b. FIGURE 4a depicts a typical receive pulse 22 before pulse compression with typical side lobes 24 and 25. Such a pulse shape might be expected to be observable at the output of the receiver 13 prior to acceptance by the pulse compression filter 8. The amplitude function $A(t)$ would be typically in accordance with $$A(t) = \frac{\sin^2 X}{X^2}$$

Recalling the type of pulse compression described in the microwave journal reference hereinbefore identified, as used in the present system, the filter 8 wil be understood to have the effect of delaying the frequency components in the $A(t)$ function in a manner so as to produce a new and compressed pulse shape $B(t)$ as illustrated in FIGURE 4b. Thus substantially all the signal energy in the main pulse 22 is contained in the compressed main pulse 23. The side lobes 26 and 27 correspond to the initial side lobes 24 and 25, respectively. When properly designed, the pulse compression filter 8 is capable of reducing the main pulse width by a factor ranging from 3 to 30 with reasonably low leading and trailing pulse residues. The peak amplitude of the main pulse 23 in FIGURE 4b is substantially that of the main pulse 22 in FIGURE 4a, since the pulse compression filter changes only the phase relationships of the frequency components comprising the pulse 22, but not the amplitudes of the spectral components.

In the illustration of FIGURE 1 the pulse compression filter 8 is shown essentially operative immediately after the first stages of IF amplification in the receiver 13. Subsequent IF amplifiers within 10 provide additional IF amplification, and accordingly, the pulse compression filter 8 is operative at a comparatively low signal level. The output of the receiver second IF amplifier 10 is fed to a conventional video detector 11 and thence to the range height indicator 18 as radar video for effecting intensity modulation of the display in the well known manner.

In addition, to providing the synchronous step control signals for the basic frequency generator 4, the programmer 9 provides an indicator cathode ray tube sweep synchronizing trigger on line 17. This trigger is adjusted in time to account for the inherent delays encountered in the pulse compression filter 8, as depicted in FIGURE 4b, vis-a-vis FIGURE 4a.

It will be recalled that the pulse-to-pulse frequency steps for the local oscillator signal and the frequency ramp for the transmitted power are provided by basic frequency generator 4 in CW form throughout the duration of each frequency step. A properly timed trigger pulse or gate from programmer 9 on line 28 provides the basis for generating transmitter pulses within transmitter pulse generator 6 at the frequency contained in the signal on lead 7. Since the programmer 9 generates the basic frequency step control, it is also logically capable of providing a digital or analog signal corresponding to the elevation angle of transmission or reception from antenna 1 at each particular frequency within each particular transmitted pulse. This information identified as coarse elevation angle data on lead 14 will vary as a function of the frequency transmitted at all times. This coarse elevation angle data provides the basic sweep angle control for the range height indicator 18, however, it is noted that this control for the range height indicator sweeps is essentially "open loop." Thus, there is no guarantee that the coarse elevation angle data accurately reflects the elevation angle of transmission or reception at all times.

It will be noted that an additional output is taken between the receiver second IF amplifier 10 and the video detector 11 and is fed to limiter discriminator 12. This limiter and discriminator 12 operates in the conventional manner for detection of frequency or phase modulated signals. Returning momentarily to FIGURE 3b, it will be noted that a frequency $f_0$ is identified at the center of the frequency variation curve for each transmitted pulse. It will also be noted that, since the local oscillator signal on lead 5 follows the transmitted frequency at a fixed frequency "distance," with respect to $f_0$, the said $f_0$ translated to IF frequency is the same for all transmitted pulses. Accordingly, the detection curve of the discriminator 12 is centered at the frequency $f_0$ and its output on lead 15, identified as fine elevation angle correction data, may be either a positive or negative signal, or the equivalent in digital code.

From an understanding of the description of FIGURE 1 thus far, it will be noted that the discriminator in 12 provides an output signal for each pulse which has an amplitude and phase relative to the mean boresite of the transmitted pulse. Since the discriminator curve 12 is centered at an IF frequency corresponding to the center beam within each transmitted pulse as aforesaid, on a pulse-to-pulse basis, the discriminator output signal 15 thus provides a measure of the angular deviation of the received signal from the center or median transmitted beam within each pulse. An adder 16 serves to algebraically add the correction signal 15 to the coarse elevation angle data 14 and from its output provides a corrected elevation angle data signal to the range height indicator 18.

In three-dimensional radar systems, or other radar systems involving frequency scanning in at least one coordinate, target coordinate data is conventionally provided by coordinate data signals which indicate the spacial position of the video signals being instantaneously received. These data signals are based on the angular coordinates of the transmitting antenna and the range of the radar signal, as determined by a time measurement between transmission and reception, the angular antenna coordinate in the plane of frequency sensitivity is determined by the transmitted frequency. In the system of the present invention the center frequency of the transmitted pulse will be seen to define the average beam position whereby the discriminator output is useable for fine correction of the displayed angular position of an individual target.

Although display on a range-height indicator is contemplated, there is no reason why the system of the present invention would not be equally useful in feeding target data to a storage bank. In that situation the angular address accuracy would be improved through the operation of the present invention.

Once the present invention is thoroughly understood, modifications and variations falling within the spirit and scope of the present invention will suggest themselves to those skilled in the art. It is not intended that the scope of the present invention be limited to the embodiment illustrated and described. The drawings and description are to be regarded as illustrative only.

What is claimed is:

1. A radar system comprising: a directive antenna adapted to radiate and receive electromagnetic energy in the shape of a beam relatively narrow in at least a first plane, said antenna being also adapted to direct said beam at an angle in said first plane which is a function of the frequency of said electromagnetic energy; transmitter means for energizing said antenna with pulses of frequency modulated electromagnetic energy whereby said beam is caused to scan through a predetermined angle in said first plane during each of said pulses; receiving means operative between successive ones of said transmitted pulses of frequency modulated electromagnetic energy for receiving target echo signals and providing corresponding video signals; indicator means responsive to an angle control signal and to said video signals for presenting at least angular target data respecting said target echo signals; programming means for controlling the generation and frequency modulation of said transmitted pulses from said transmitter means, and for generating said indicator angle control signal continuously in accordance with the variations of instantaneous frequency corresponding to the programmed antenna directivity angles; discriminator means for detecting the relation of the frequency of energy contained in said echo signals to an arbitrary frequency representative of a predetermined angle within the angular scan effected during one of said transmitted pulses, and for producing a vernier signal of sense corresponding to the sense of the difference between said echo signal frequency and said arbitrary frequency; and means for modifying said indicator angle control signal in accordance with the amplitude and sense of said vernier signal, thereby to improve the accuracy of said angular target data presented by said indicator means.

2. A radar system comprising: antenna means adapted to be energized by electromagnetic energy for radiating a pencil beam at an angle in the elevation plane which angle is a function of the frequency of said electromagnetic energy; transmitter means for energizing said antenna with a plurality of time spaced relatively long pulses of said electromagnetic energy, said energy continuously varying in frequency throughout the duration of each of said pulses, said frequency variation being such as to cause scanning of said pencil beam during each of said pulses, through an elevation angle which is a predetermined fraction of the total intended elevation scan angle; receiver means operatively connected to said antenna means to receive target echo signals in the time between successive transmitter pulses, said receiver means including conversion means for generating IF signals and a detector responsive to said IF signals of said receiver to produce a video output; a cathode ray indicator including sweep generating circuits responsive to timing signals and to an angle data signal, and means to apply said video output as an intensity modulation signal to said cathode ray indicator; programming means for supplying said timing signals, for generating and programming said angle data signal and for controlling the generation of said frequency varying pulses of electromagnetic energy such that the center frequency of said energy which is varying in frequency throughout the duration of each of said pulses is changed progressively from pulse-to-pulse whereby the entire elevation angle of interest is scanned by a predetermined number of said pulses constituting an elevation scan cycle; means responsive to said IF signals for comparing the frequencies of said target echo signals to a frequency within the IF domain corresponding to the center of the said frequency variation within the duration of any of said pulses for generating an angle data correction signal representative of the magnitude and sense of the difference between the angle represented by the said angle data signal provided by said programming means and the actual angle represented by a predetermined target echo; and means for applying said angle data correction signal to said angle data signal for providing and applying to said cathode ray indicator sweep generating circuits a corrected angle data signal.

3. The invention set forth in claim 2 further defined in that pulse compression means are included in series with the signal path within said receiving means for reducing the time duration of signals in said video output.

4. The invention set forth in claim 2 further defined in that pulse compression means connected in series with the IF circuits in said receiver are included in the signal path ahead of said detector, for reducing the frequency spread representing any given echo signal, whereby the said echo signal will be reduced in time duration at said video output.

5. The invention set forth in claim 2 in which the said energy continuously varying in frequency throughout the duration of each of said pulses is defined as varying substantially linearly as a function of time and said antenna is further defined as having an approximately linear relationship between frequency and beam angle over the frequency variation within any of said pulses.

6. The invention set forth in claim 2 further defined in that said antenna is rotated mechanically in azimuth at a rate which is sufficiently slow so that succeeding elevation scan cycles are sufficiently close together in azimuth angle as to substantially eliminate hiatus in the scan coverage of said radar system.

7. The invention set forth in claim 5 further defined in that pulse compression means are included in said receiver in series with the IF circuits therein, said pulse compression means being adapted for introducing phase versus frequency relationships which are substantially the inverse of those introduced by the said linear variation of frequency within each of said pulses.

8. The invention set forth in claim 2 in which duplexing means are included in the antenna, transmitter and receiver interconnections whereby negligible energy is diverted into the input of said receiver means during transmission of said pulses and only negligible echo signal energy received by said antenna at other times is diverted toward said transmitter means.

9. The invention set forth in claim 2 in which said means for providing and applying said corrected angle data signal to said angle data signal includes an algebraic adder for modifying said angle data signal in accordance with the mgnitude and sense of said angle data correction signal.

10. The invention set forth in claim 2 in which the frequency separation of the said center frequencies of successive ones of said pulses is less than the total frequency variation within each of said pulses, whereby said successive pules overlap each other in elevation angle coverage.

References Cited

UNITED STATES PATENTS

| | | | |
|---|---|---|---|
| 2,624,876 | 1/1953 | Dicke | 343—13 |
| 3,034,117 | 5/1962 | Tower et al. | 343—11 |
| 3,039,097 | 6/1962 | Strumwasser et al. | 343—782 X |
| 3,119,998 | 1/1964 | Foley | 343—16 |
| 3,176,296 | 3/1965 | Adams | 343—17.2 |
| 3,311,913 | 3/1967 | Varela | 343—16 |

RICHARD A. FARLEY, *Primary Examiner.*

MALCOLM F. HUBLER, *Assistant Examiner.*

U.S. Cl. X.R.

343—17.2